Jan. 10, 1967  C. G. SEWELL  3,296,959
CHECK WRITER
Filed May 21, 1965  3 Sheets-Sheet 1
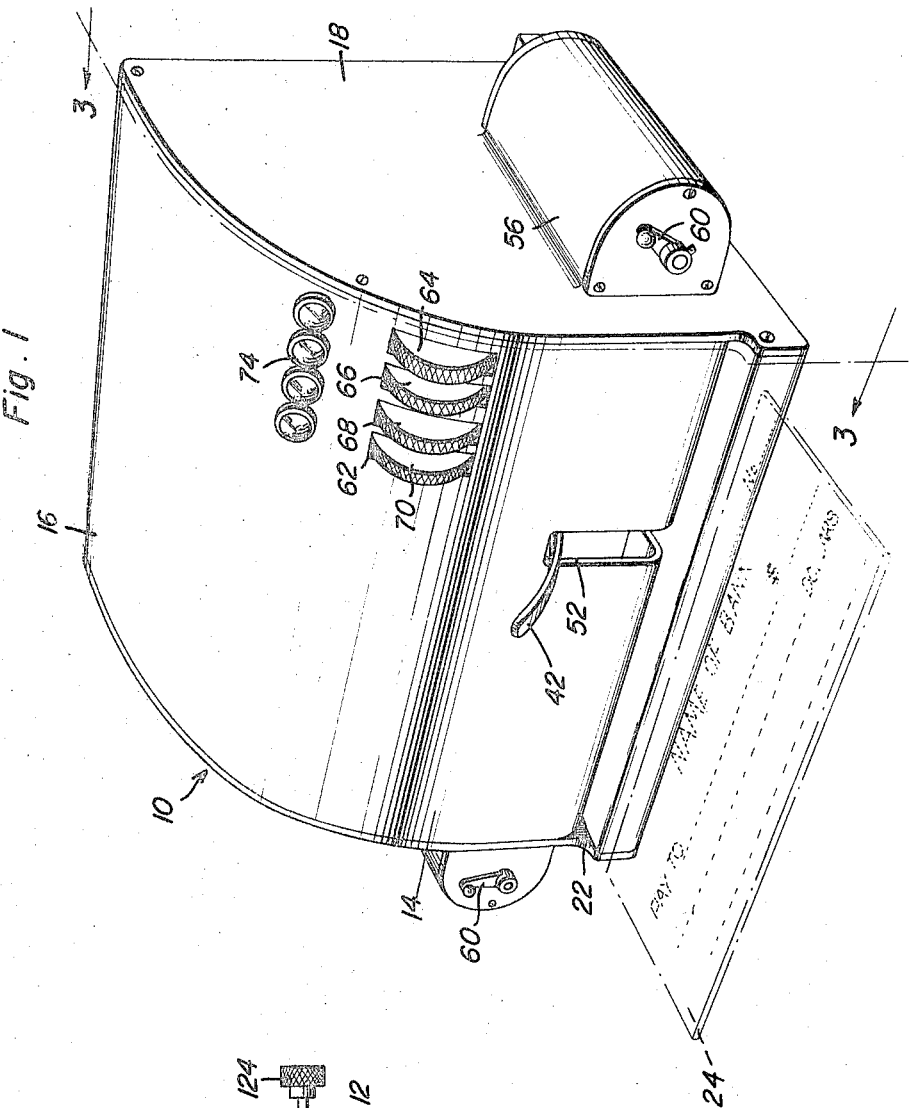
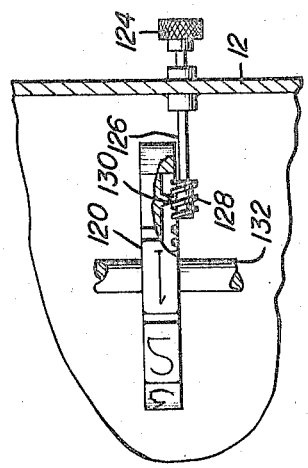
Cyrus G. Sewell
INVENTOR.
BY *Clarence A. O'Brien*
*and Harvey B. Jacobson*
Attorneys Cyrus G. Sewell
INVENTOR.

Jan. 10, 1967  C. G. SEWELL  3,296,959
CHECK WRITER

Filed May 21, 1965  3 Sheets-Sheet 3

Cyrus G. Sewell
INVENTOR.

BY *Clarence A. O'Brien*
*and Harvey B. Jacobson*
Attorneys

United States Patent Office 3,296,959
Patented Jan. 10, 1967

3,296,959
CHECK WRITER
Cyrus G. Sewell, P.O. Box 738,
Sweetwater, Tex. 79556
Filed May 21, 1965, Ser. No. 457,656
2 Claims. (Cl. 101—80)

The present invention generally relates to a check writer and more particularly to such a device especially adapted for use at the collection counter, check-out stand or the like where collection is made for merchandise sold at retail such as supermarkets, department stores, discount centers and the like.

As is well known, one of the major delays encountered in supermarkets, department stores, discount centers and the like is the necessity of a customer writing out a check after the total sale price of the items being purchased has been totalled by the cashier. Usually, the customer being in a hurry makes mistakes or sometimes overlooks completing certain portions of the check. Generally, writing checks in longhand is a tedious and time-consuming task having a relatively high incidence of human error. Inasmuch as substantially all of sales made total less than one hundred dollars, the check writer of the present invention employs only four digits. The name of the store or payee will be permanently installed in the check writer and in a very few seconds, the cashier may set up the amount of the check to be written by the check writer and print the same ready for the customer's signature thus conserving valuable minutes of time and eliminating one of the causes of irritation and dissatisfaction of customers waiting in line.

By employing the check writer of the present invention, valuable time can be saved at the check-out stand inasmuch as it has been found that more than seven out of every ten people at a supermarket will write a check to pay for the purchase. This check writer eliminates the possibility of error which occurs frequently and the check writer also imprints on the check a code so that the check can be subsequently handled by electronic equipment employed in automated check handling procedures. Further, the check writer of the present invention enables the check to be more easily read and the check writer gives a protective measure since the indelible ribbon employed therein will almost eliminate the possibility of alteration of the check.

Having all of the above factors in mind, one of the major objects of the present invention is to provide a check writer which is relatively simple in construction, fool-proof in operation and relatively inexpensive thus making the check writer economically feasible for positioning at each check-out stand in a store having a multiple of such check-out stands.

A further object of the present invention is to provide a check writer that is effective for the purpose of printing checks and will include the date, payee, amount of the check in figures and the amount of the check as well as the code printing of the amount of the check on the line below the payee line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the check writer of the present invention;

FIGURE 5 is a detailed sectional view illustrating the mechanism for operating the date printing element.

Figure 2:
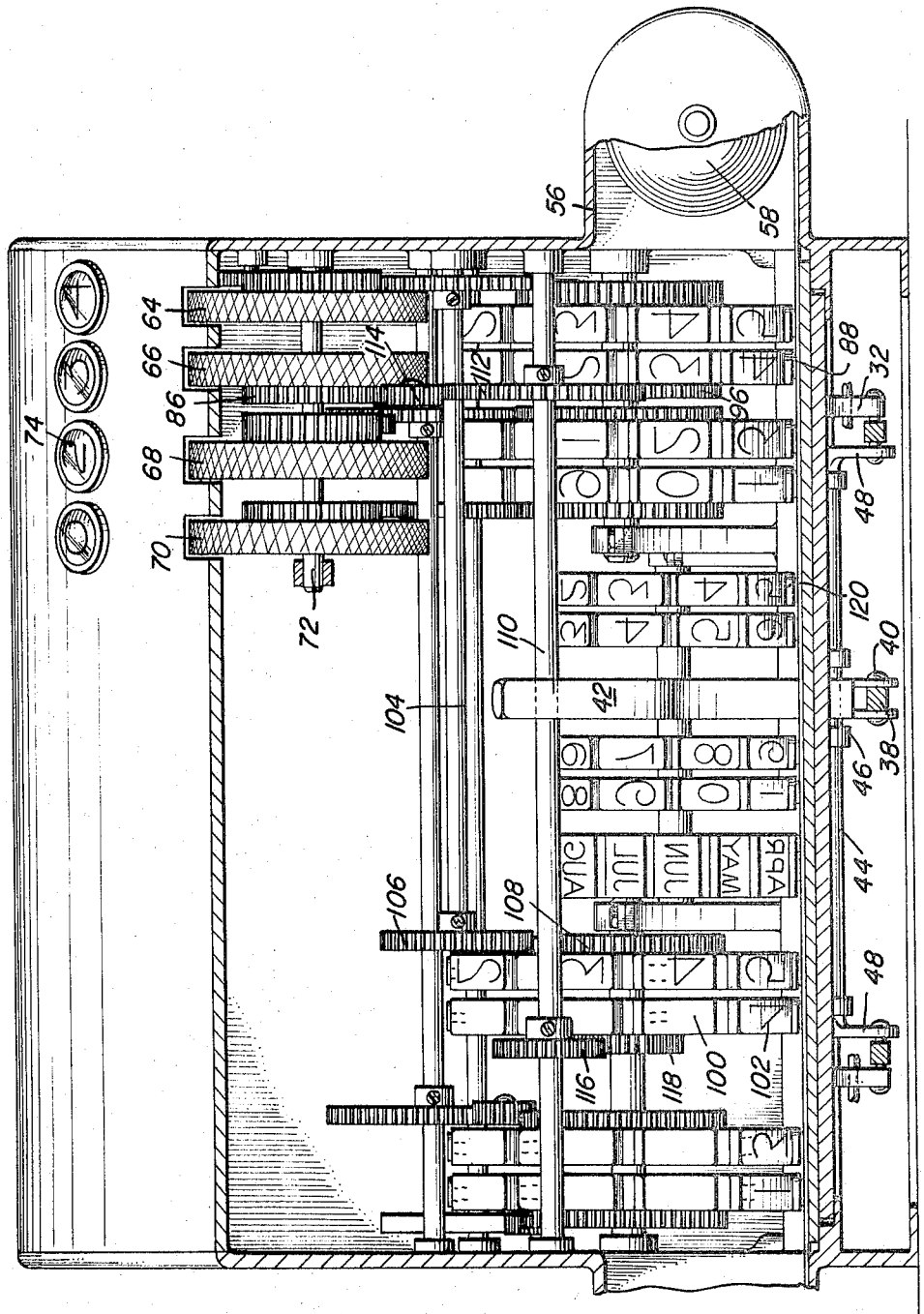
FIGURE 2 is a front view of the check writer with the housing removed illustrating the orientation of the structural details of the invention.

Referring now specifically to the drawings, the numeral 10 generally designates the check writer of the present invention which includes a hollow housing including a back plate 12, a front wall or plate 14, a curved top 16 and end wall 18 all interconnected in a suitable manner to form a hollow housing having a bottom or base structure generally designated by the numeral 20. The front 14 of the housing is provided with an entrance slot 22 for receiving a check 24 in the manner illustrated in FIGURE 1. Disposed in the base 20 is a movable plate 26 which is in the form of a platen that is supported by ledge members 28 and is vertically movably retained in place by short vertical guides 30. The check 24 rests against the plate 26 in the manner illustrated in FIGURE 3 when inserted therein and is raised and lowered by a pair of lifting elements 32 in the form of curved links having cam surfaces 34 engageable with the plate 26 at a plurality of longitudinally spaced points and at transversely spaced points. Each of the links 32 is pivotally supported on a pivot pin 36 and the end thereof opposite from the cam surface 34 is connected to an operating rod 38 by pivot pins 40 or the like. The operating rod 38 in turn is connected to an elongated operating lever 42 that is fixedly connected to a shaft 44 journalled in bearings 46 carried by the base 20. The shaft 44 has depending lugs 46 attached to the operating rod 38 by pivot pins 50 with the central lugs 48 being in the form of an extension of the operating lever 42. The end of the operating lever 42 is upwardly curved as illustrated in FIGURE 1 and extends through a slot 52 in the front wall 14 of the cabinet for operation of the plate 26 from exteriorly of the casing.

Extending above the check 24 is an ink impregnated ribbon 54 which extends laterally into a housing 56 and is wound on a reel 58 provided with manually operated handles 60 or the like by which the reel may be fed longitudinally across the check 24. The inked ribbon may have indelible ink thereon and in lieu of the manually operated handle mechanism 60 for altering the position of the ribbon, a suitable ribbon advancing mechanism may be provided. For example, a ratchet mechanism may be interconnected between the hand lever and the ribbon mechanism for advancing the ribbon a predetermined increment for each operation of the operating lever 42. A reversing mechanism such as that employed on a typewriter ribbon may be employed for automatically reversing the ribbon when the ribbon has been run through the machine in one direction thus enabling efficient use of the ribbon.

While a manually operated lever has been illustrated for operating the platen, other conventional operating mechanism may be employed. For example, the device may be electrified by providing a solenoid operating mechanism for the plate 26 which will be automatically operated when the check is inserted into the slot. Such a solenoid operated device may be operated automatically or by a manual switch structure or the like. The printing tape is wide enough to imprint the date on the check as well as the amount of the check and also will incode the amount in a manner that the check may be subsequently handled by bookkeeping machines.

The curved top wall 16 is provided with a plurality of slots 62 having four rotatable wheels 64, 66, 68 and 70 disposed therein with each of the wheels having a serrated peripheral surface so that a thumb may be used to rotate the wheels which are mounted on a shaft 72. Located above each of the slots 62 is a viewing glass 74 for magnifying indicia 76 appearing on an indicator wheel 78. Each indicator wheel 78 is provided with a gear 80 attached to the side thereof in meshing engagement with an idler gear 82 carried on a shaft 84 which in turn is in meshing engagement with a gear 86 fixed to the side of one of operating wheels such as operating wheel 64 illustrated in FIGURE 3. Thus, as the individual wheels 64–70 are operated, the setting of a wheel will be indicated through the viewing window 74.

Disposed centrally and toward the bottom of the check writer is a rotatable printing wheel 88 having a plurality of printing elements 90 spaced peripherally thereof. The printing wheel 88 is carried by a shaft 92 supported by support elements 94. Also, the printing wheel 88 is provided with a gear 96 in meshing engagement with an idler gear 98 which is also in meshing engagement with the gear 86 rigid with the operating wheel 64 thereby providing a direct gear connection for positioning a selected printing member 90 at the lowermost position while the same character will be observable through the viewing window 74 so that the amount of the check to be written will be observed by observing the windows 74.

The operating 64 is known as the units wheel, the wheel 66 is the tens wheel, the wheel 68 is the hundreds wheel and the wheel 70 is the thousands wheel thus enabling four printing wheels 88 to be individually adjusted. Suitable mechanism may be provided for retaining the printing wheel in adjusted position such as a spring biased detent, friction element or the like.

The mechanism for interconnecting the four operating wheels and the four corresponding printing wheels and the four corresponding indicating wheels is all the same and will set the printing elements for printing the amount of the check on the blank line at the right hand end of the payee line.

Figure 3:
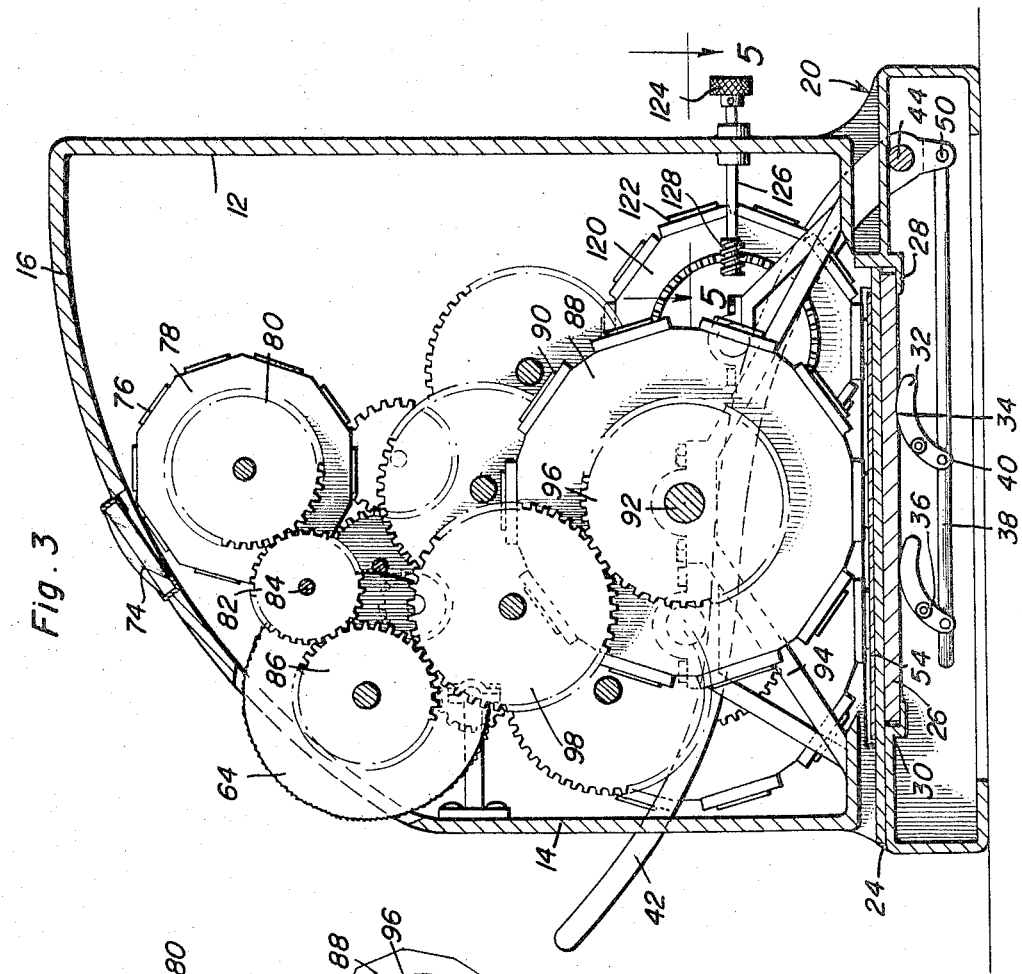
FIGURE 3 is an end view with the end of the casing removed illustrating the relationship of the gear mechanism.
Figure 4:
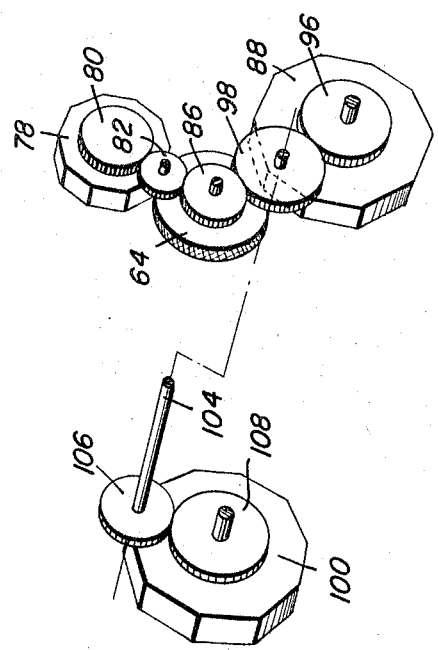
FIGURE 4 is a schematic perspective view illustrating a representative set of operating mechanism for the printing element.

Simultaneously, four additional printing wheels 100 having printing and coding elements 102 thereon are orientated adjacent the end of the check writer opposite to the printing wheels 88 and will serve to print the amount of the check on the line of the check immediately below the payee line. In addition, these printing elements encode the amount in suitable magnetic ink or the like. A mechanical interconnection is provided between the printing wheel 88 and the printing wheel 100 in order to correspondingly drive the printing wheels 100. As illustrative of this interconnection, the intermediate gear 98 has a shaft 104 supporting the same which has a corresponding gear 106 on the other end thereof for driving a gear 108 rigid with the printing wheel 100 which corresponds to the printing wheel 88 driven by the first operating wheel 64. For each corresponding operating wheel 66, there is a separate gear drive mechanism to the operating gear 96 on the printing wheel 88 corresponding to the operating wheel 66 and a corresponding interconnecting shaft such as shaft 110. This shaft 110 is engaged with a gear 112 on one end thereof which meshes with the gear 96 on the tens printing wheel 88 and the gear 112 is in turn in meshing engagement with an idler gear 114 that meshes with the gear 86 on the tens operating wheel 66. The shaft 110 includes a gear 116 on the opposite end thereof in meshing engagement with a gear 118 on the tens printing wheel 100. In order to orientate the shaft so that they do not interfere with each other, they are orientated peripherally of the printing wheels 88 as illustrated in FIGURES 2 and 3.

The printing mechanism also has a plurality of date printing wheels 120 orientated in position for printing the date on the check and these printing wheels have a plurality of printing elements 122 thereon and are rotated by a plurality of operating knobs 124 carried on the outer ends of operating shafts 126. The shaft 126 includes a worm gear 128 on the end thereof engaging a pinion gear 130 carried by the printing wheel 120 but is mounted on a shaft 132 so that by adjusting the knobs 124, the month, day and year indicia may be adjusted so that the date will be imprinted on the check along with the amount of the check. The various dollar marks, name of the payee and appropriate decimal points and "CPS" are permanently affixed to printing elements in a manner not shown so that these elements will be printed each time the printer is operated.

The orientation of the encoding elements may be varied so that the amount of the check may be encoded on the code line adjacent the bottom edge of the check or any other desired position on the check suitable for use with conventional machines.

Thus, the check may be encoded on the line below the payee line or on the code line at the bottom of the check.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A check writer comprising a housing having an entrance slot formed therein for receiving a check to be printed, a first set of printing elements movably mounted within said housing and disposed adjacent said throat, means engaged with said printing elements of the first set for moving the printing elements of the first set independently of each other, indicating means operatively connected with said means for moving the printing elements for indicating the position of the individual printing elements in the first set, a second set of printing elements in said housing and orientated in laterally spaced and offset relation to the first set of printing elements, drive means interconnecting the first and second sets of printing elements for simultaneous movement thereof, and means carried by said housing for moving the check and printing elements into printing relation to each other, a printing ribbon disposed between said printing elements and the check, said printing ribbon having transfer material thereon, and means supporting the printing ribbon in position between the printing elements and the check, said means for moving the check and printing elements into printing relation including a plate for supportingly engaging the check when inserted into the housing, means engaged with the plate for moving the plate toward and away from said printing elements, said printing elements of each set being disposed in circumferentially spaced relation on a plurality of coaxial printing wheels, said means for moving the printing elements of said first set including an operating wheel operatively connected to each printing wheel of the first set of printing elements, each operating wheel disposed adjacent the printing wheel to which it is operatively connected and having a portion of the periphery thereof disposed exteriorly of the housing, said operating wheels being orientated in coaxial relation, said indicating means being operatively connected with each operating wheel to indicate the position of each printing wheel, wherein said means interconnecting the first and second sets of printing elements for simultaneous movement thereof including a plurality of parallel drive shafts with one end of each shaft being operatively connected to a printing wheel of the first set of printing elements and the opposite end of each shaft being operatively connected to a corresponding printing wheel of the second set of printing elements.

2. The structure as defined in claim 1 wherein said indicating means includes a plurality of wheels having indicia disposed on the periphery of each wheel, said indicating wheels being disposed in lateral alignment with the operating wheels and operatively connected thereto for movement in response to movement of the operating wheels, the periphery of the indicating wheels being disposed adjacent the interior of the housing, said housing having openings therein for enabling observation of the indicia on the indicating wheels, and magnifying means disposed in said openings; for enabling the indicia on the indicating wheels to be readily observed, said indicating wheels, openings and magnifying means being in alignment with the operating wheels to enable an operator to conveniently manipulate the operating wheels and observe the indicia on the indicating wheels.

References Cited by the Examiner

UNITED STATES PATENTS

| | | | |
|---|---|---|---|
| 1,080,913 | 12/1913 | Joline. | |
| 1,122,605 | 12/1914 | Kettering | 101—100 |
| 1,497,149 | 6/1924 | Lehmann | 101—99 |
| 2,105,660 | 1/1938 | Kirshner | 101—99 X |
| 2,338,590 | 1/1944 | Komusin | 101—100 |
| 3,120,800 | 2/1964 | Ward | 101—85 X |

ROBERT E. PULFREY, *Primary Examiner.*

W. F. McCARTHY, *Assistant Examiner.*